Jan. 24, 1956     F. J. AVES     2,731,935
CURB INDICATOR

Filed Jan. 11, 1955     2 Sheets-Sheet 1

INVENTOR
FRED J. AVES
BY
Mason & Graham
ATTORNEYS

Jan. 24, 1956 F. J. AVES 2,731,935
CURB INDICATOR
Filed Jan. 11, 1955 2 Sheets-Sheet 2
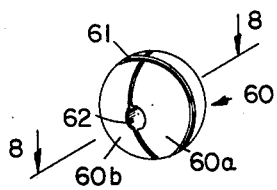
FIG. 7.
FIG. 10.
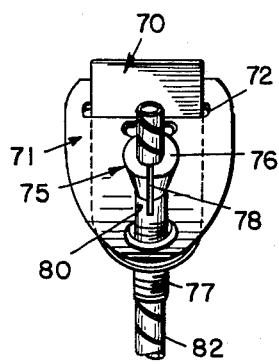
FIG. 9.
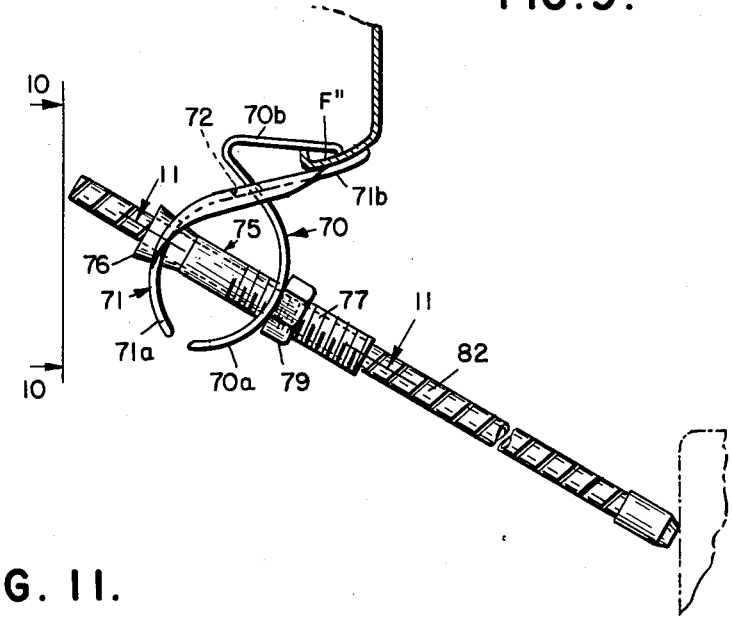
FIG. 11.
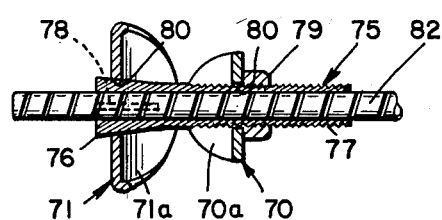
FIG. 8.
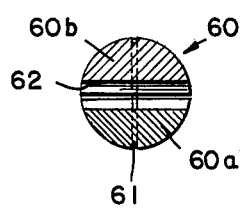
FIG. 12.
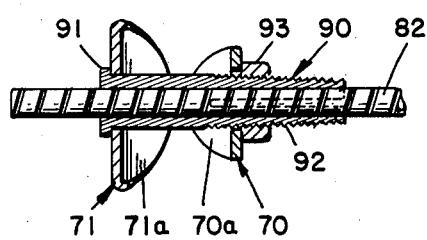
INVENTOR
FRED J. AVES
BY
ATTORNEYS

United States Patent Office 2,731,935
Patented Jan. 24, 1956

2,731,935

CURB INDICATOR

Fred J. Aves, Los Angeles, Calif.

Application January 11, 1955, Serial No. 481,150

5 Claims. (Cl. 116—28)

This invention relates to curb indicator attachments for automobiles for the purpose of providing an audible alarm when the automobile approaches too close to a street curb during parking.

It is an object of my invention to provide a curb indicator which is easy to install, which is readily adjustable as to length and angularity so as to suit varying conditions due to automobiles having fenders of different height above the ground, which may be easily locked in adjusted position, and which utilizes a novel, extremely durable, yet freely flexible, resonant tubular member as a feeler element.

Another object is to provide a curb indicator device which requires only a single bolt for securing the feeler element in any adjusted position and for securing the device to an automobile fender, which bolt is accessible for easy manipulation without having to reach behind the fender.

Other objects and advantages will appear hereinafter.

While I shall point out in the appended claims those features which I believe to be new, I shall now, for the purpose of explaining my invention, describe in detail a presently preferred embodiment thereof, for which purpose I shall refer to the accompanying drawing, wherein:

Fig. 7 is a perspective view of a modified form of antenna retaining element;

Fig. 8 is a section taken on line 8—8 of Fig. 7;

Fig. 9 is a side elevation of a further modified form of curb alarm device;

Figure 1:
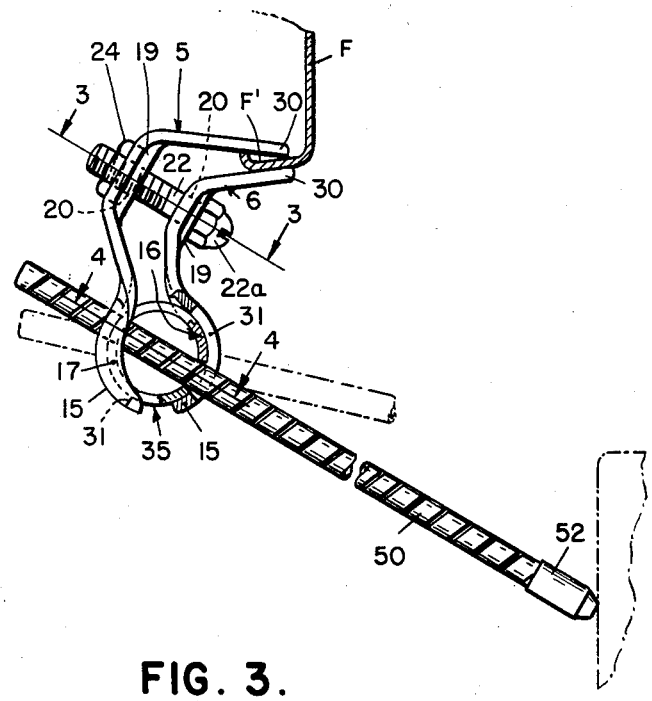
Fig. 1 is a side elevational view showing my device attached to the fender of an automobile.
Figure 2:
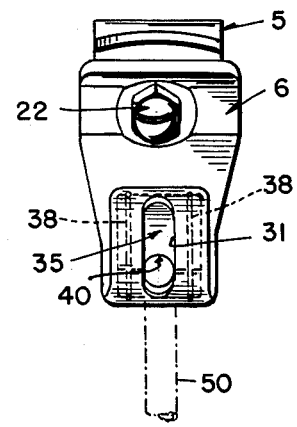
Fig. 2 is a front elevational view.
Figure 3:
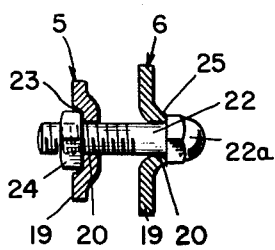
Fig. 3 is a section taken on line 3—3 of Fig. 1.

Figs. 10 and 11 are views taken, respectively, on lines 10—10 and 11—11 of Fig. 9; and Fig. 12 is a fragmentary sectional view showing a further modification.

Referring now to the drawing, 5 and 6 denote a pair of opposed jaws each having a substantially semi-circular lower end portion 15 defining a recess 16 to receive the antenna retaining element to be described, the recess being bounded at its sides by inturned flange portions 17. Each jaw has a bowed portion 19, the bowed portion of each jaw having an opening 20 to receive a screw 22. The opening 20 in jaw 5 passes through an inwardly embossed recess portion 23 of the jaw which recess receives the nut 24 to prevent the nut from turning with screw 22, while the opening 20 in jaw 6 passes through a portion of the jaw which is oppositely embossed at 25 to provide a raised surface engageable by the head 22a of the screw 22.

The top end portions 30 of the jaws clamp the flanged portion F' of the automobile fender F therebetween. An elongated slot 31 is provided in the lower portion of each jaw, the slot communicating with recess 16, to pass and allow swinging movement of the antenna element relative to the jaws.

Clamped between the lower end portions of the jaws, within the recesses 16, I provide an antenna retaining sleeve-like member, generally denoted by the numeral 35. This retaining member is comprised of two opposed semi-circular segments 35a, 35b, each segment being provided with a pair of longitudinally spaced peripheral grooves 37. A pair of split resilient rings 38 are provided, one disposed in each of the grooves, to yieldably clamp the segments against the antenna to be described.

Figure 4:
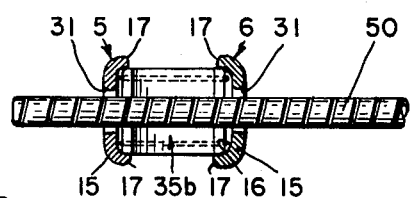
Fig. 4 is a section taken on line 4—4 of Fig. 1.
Figure 5:
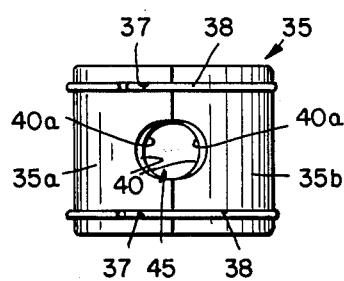
Fig. 5 is an elevational view of the antenna retaining member.
Figure 6:
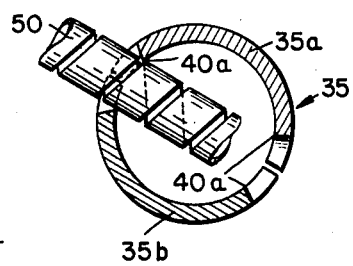
Fig. 6 is a cross sectional view of the retaining member carrying the antenna member.

The two ends of each of the segments are each provided with a recess 40, which is generally somewhat semi-circular in shape except that it is curved substantially about a radius smaller than the radius of curvature of the antenna element to be described, so that, when the two segments are clamped together, they engage the antenna therebetween. The recesses 40 in the ends of one of the segments form, with the recesses in the ends of the other segment, a pair of diametrically opposite, elongated or somewhat ovate openings 45 to receive the antenna element to be described. Also, as will be best seen in Figs. 4 and 5, the surfaces defining the recesses 40 are beveled to provide relatively sharp inner edges 40a to engage between the spiral convolutions of the antenna element as threads.

The antenna element 50 is formed of a narrow, flat, elongated strip of resilient, resonant metal formed into a substantially tightly wound spiral—that is, the spiral is so tightly wound that the spaces between the convolutions are quite narrow, preferably being of a width of the order of one-sixteenth of an inch. A ferrule 52 is frictionally fitted over the outer end of the antenna.

It will be seen that the screw 22, when tightened, not only clamps the jaws against opposite sides of the fender flange, or any other part of the automobile body or chassis, but also clamps the segments of the retaining member 35 against the antenna so that the antenna becomes locked in any position of adjustment. However, by loosening the screw 22, the resiliency of the rings 38 is such as to permit the segments 35a, 35b to move apart and allow the antenna 50 to be screwed into or out of the retainer to lengthen or shorten its outwardly projecting portion; and also, when the screw is thus loosened, the retaining member 35 may be rotated in the recesses 16 to swing the antenna upwardly or downwardly.

The antenna, being composed of resonant, resilient metal formed into a spiral, is not only sufficiently rigid and resonant to transmit to the body of the automobile any vibrations produced by the outer end of the antenna engaging a curbstone, but it is flexible and yieldable enough to permit the antenna to yield before being permanently deformed by such engagement. Thus, the antenna is capable of a much longer life than is true of any type of antenna element of which I am aware, and, being tubular, the antenna is more resonant.

In Figs. 7 and 8 I show a modified form of an antenna retaining member 60 which is spherical, being composed of two hemispherical segments 60a, 60b resiliently held together by split resilient ring 61. Each of the segments has a half-round diametrically extending recess, the recesses of the two segments mating when the segments are assembled so that the recesses together form a cylindrical diametrically extending opening 62. This spherical retaining member 60 may be substituted for the retaining member 35 before described.

In Figs. 9–11 I show a further modified form of device wherein there are two opposed jaws 70, 71. Jaw 70 is substantially S-shaped, having an outwardly curved bottom portion 70a and a substantially straight top portion 70b. Jaw 71 has an outwardly curved bottom portion 71a and a substantially straight top portion 71b. Jaw 70 extends through an opening 72 in jaw 71 so that the jaws are pivoted to swing toward and away from each other, the top portions of the jaws being adapted, when swung toward each other, to clamp therebetween the flanged portion F" of an automobile fender. Here the antenna retaining member 75 is in the form of a sleeve having a headed inner end 76 which tapers towards the outer end 77 and has a longitudinal split 78. The outer end of the retaining member 75 is exteriorly threaded to receive a nut 79. Each of the jaws 70, 71 has a longitudinal slot 80 to pass the antenna retaining member 75. The antenna 82 axially adjustably extends through the bore of the sleeve-like retaining member 75 and may be held against axial movement in the sleeve when the split end 76 of the sleeve is constricted about the antenna by screwing the nut 79 against jaw 70.

In the modification of Fig. 12 the jaws 70, 71 and the antenna 82 are the same as in Figs. 9–11. Here, however, the antenna retaining member 90 is in the form of a sleeve having a flanged inner end 91 and a longitudinally split, tapered outer end 92. The nut 93 is threaded onto the split tapered outer end portion 92.

I claim:

1. In a curb indicator device having bracket means adapted to be attached to an automobile, the combination with said bracket means of an elongated tubular antenna element carried by said bracket, said antenna element comprising an elongated strip of flat resonant metal formed into a loose spiral presenting a longitudinally extending spiral space separating contiguous whorls of said spiral.

2. In a curb indicator arranged to be attached to a part of an automobile to produce a vibratory signal upon too close approach of the automobile to an obstruction, a resilient vibratory antenna rod, an antenna rod retaining member through which said rod diametrically extends, said retaining member comprising two opposed semi-circular segments having in their opposite surfaces mating antenna passing recesses, a pair of opposed jaw members cooperatively arranged at one end to clamp said automobile part therebetween and having opposed jaw portions at their other ends presenting opposed recesses rotatably adjustably receiving said retaining member and presenting transversely through said jaw portions registering antenna rod passing openings elongated in a direction longitudinally of said jaw portions whereby to permit swinging movement of said antenna rod about the longitudinal axis of said retaining member, and screw means extending transversely through said jaw members between the ends of the latter and cooperating with said jaw members to urge the same towards each other.

3. The curb indicator of claim 2 which additionally includes resilient split ring means embracing and yieldably holding said segments together.

4. The curb indicator of claim 2 wherein said antenna rod threadedly engages said retaining member.

5. In a curb indicator arranged to be attached to a part of an automobile to produce a vibratory signal upon too close approach of the automobile to an obstruction, a resilient vibratory antenna rod, an antenna rod retaining member through which said rod diametrically extends, said retaining member comprising a pair of segments having in their contiguous side edge portions registering antenna rod passing recesses, resilient split rings extending about and yieldably holding said segments together, a pair of substantially U-shaped opposed jaw members cooperatively arranged at one end to clamp said automobile part therebetween and having opposed jaw portions at their other ends presenting opposed recesses receiving said retaining member, said jaw portions presenting transverse, elongated openings through which said antenna rod extends, and screw means extending transversely through said jaw members intermediate the ends of the latter and adapted to urge said jaw members towards each other in said clamping relation to said retaining member and said automobile part; said retaining member being rotatable between said jaw portions when said screw means is not in tightened position whereby to adjustably swing said antenna rod within the limits of the lengths of said elongated openings.

References Cited in the file of this patent

UNITED STATES PATENTS

| | | |
|---|---|---|
| 1,529,231 | Arnold | Mar. 10, 1925 |
| 1,679,715 | Fish | Aug. 7, 1928 |
| 2,642,830 | Aves | June 23, 1953 |
| 2,662,715 | McKnight | Dec. 15, 1953 |
| 2,667,854 | Ihlein | Feb. 2, 1954 |